(12) United States Patent
Yamagishi

(10) Patent No.: US 10,294,993 B2
(45) Date of Patent: May 21, 2019

(54) LUBRICANT SUPPLY DEVICE FOR LINEAR GUIDE APPARATUS, AND LINEAR GUIDE APPARATUS

(71) Applicant: NSK Ltd., Shinagawa-ku, Tokyo (JP)

(72) Inventor: Nobuaki Yamagishi, Hanyu (JP)

(73) Assignee: NSK Ltd., Tokyo (JP)

( * ) Notice: Subject to any disclaimer, the term of this patent is extended or adjusted under 35 U.S.C. 154(b) by 830 days.

(21) Appl. No.: 14/780,547

(22) PCT Filed: Feb. 28, 2014

(86) PCT No.: PCT/JP2014/055112
§ 371 (c)(1),
(2) Date: Sep. 27, 2015

(87) PCT Pub. No.: WO2014/156473
PCT Pub. Date: Oct. 2, 2014

(65) Prior Publication Data
US 2016/0061261 A1 Mar. 3, 2016

(30) Foreign Application Priority Data

Mar. 27, 2013 (JP) ................................. 2013-066529
Feb. 11, 2014 (JP) ................................. 2014-023927

(51) Int. Cl.
*F16C 33/66* (2006.01)
*F16N 21/06* (2006.01)
(Continued)

(52) U.S. Cl.
CPC .......... *F16C 33/66* (2013.01); *F16C 29/0609* (2013.01); *F16C 33/6659* (2013.01);
(Continued)

(58) Field of Classification Search
CPC .. F16C 33/66; F16C 33/6648; F16C 29/0609; F16N 19/00; F16N 21/06; F16N 7/12
(Continued)

(56) References Cited

U.S. PATENT DOCUMENTS 5,139,347 A * 8/1992 Hattori ................ F16C 29/0609
384/15
6,082,899 A * 7/2000 Suzuki ................ F16C 29/0609
184/5
(Continued)

FOREIGN PATENT DOCUMENTS

JP 5-71443 * 9/1993
JP 5-71443 U 9/1993
(Continued)

OTHER PUBLICATIONS

Office Action dated Dec. 19, 2017, in Japanese Patent Application No. 2014-066101.
(Continued)

*Primary Examiner* — Michael R Mansen
*Assistant Examiner* — Mark K Buse
(74) *Attorney, Agent, or Firm* — Sharpiro, Gabor and Rosenberger, PLLC

(57) ABSTRACT

A lubricant supply device for a linear guide apparatus is configured to include an end cap 5, and a container 7 retaining lubricant and disposed adjacent to the end cap 5. The end cap 5 is formed with a through-hole 16 extending toward the container 7 from a direction change path 5*a*. The container 7 is formed with an aperture communicating with the through-hole 16 of the end cap 5. The lubricant is supplied into the direction change path 5*a* via the aperture of the container 7 and the through-hole 16 of the end cap 5. The
(Continued)

slider can be thereby lubricated while preventing damage to a rolling element and the direction change path of the end cap.

7 Claims, 14 Drawing Sheets

(51) Int. Cl.
  *F16N 19/00* (2006.01)
  *F16N 7/12* (2006.01)
  *F16C 29/06* (2006.01)
(52) U.S. Cl.
  CPC ............... *F16N 7/12* (2013.01); *F16N 19/00* (2013.01); *F16N 21/06* (2013.01); *F16C 33/6648* (2013.01)
(58) Field of Classification Search
  USPC .......................................................... 184/14
  See application file for complete search history.

(56) References Cited

U.S. PATENT DOCUMENTS

| | | | | |
|---|---|---|---|---|
| 6,125,968 | A * | 10/2000 | Shirai | F16C 29/008 184/100 |
| 6,257,766 | B1 * | 7/2001 | Agari | F16C 29/0609 384/15 |
| 6,401,867 | B1 * | 6/2002 | Michioka | B23Q 1/58 184/100 |
| 2002/0136472 | A1 * | 9/2002 | Mochizuki | F16C 29/0607 384/45 |
| 2007/0237436 | A1 * | 10/2007 | Chen | F16C 29/0609 384/45 |
| 2009/0016654 | A1 * | 1/2009 | Kakei | F16C 29/0609 384/44 |
| 2010/0002965 | A1 | 1/2010 | Kondo | |
| 2013/0195386 | A1 * | 8/2013 | Matsumoto | F16C 29/086 384/13 |
| 2015/0337899 | A1 * | 11/2015 | Kadono | F16C 29/0609 384/43 |
| 2015/0345560 | A1 * | 12/2015 | Roesch | F16C 33/66 384/13 |
| 2016/0245337 | A1 * | 8/2016 | Yamagishi | F16C 33/6648 |
| 2018/0066709 | A1 * | 3/2018 | Yamagishi | F16C 29/06 |

FOREIGN PATENT DOCUMENTS

| | | | |
|---|---|---|---|
| JP | 11-22726 | A | 1/1999 |
| JP | 2009-63059 | A | 3/2009 |
| JP | 2009-68611 | A | 4/2009 |
| JP | 2010-014228 | A | 1/2010 |
| JP | 2011-52700 | A | 3/2011 |
| JP | 2011052700 | * | 3/2011 |

OTHER PUBLICATIONS

English Translation of International Preliminary Report on Patentability from International Patent Application No. PCT/JP2014/055112, dated Oct. 8, 2015.

* cited by examiner

FIG. 12A
FIG. 12B
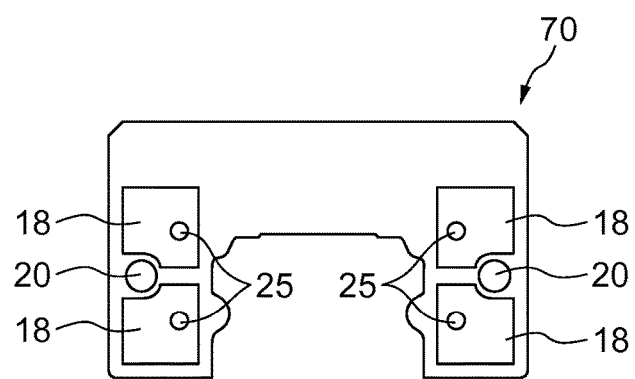
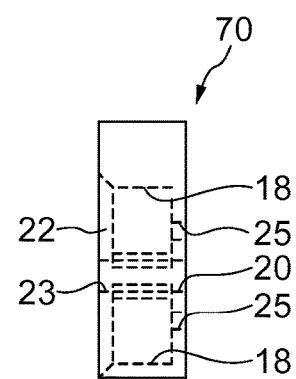

LUBRICANT SUPPLY DEVICE FOR LINEAR GUIDE APPARATUS, AND LINEAR GUIDE APPARATUS

TECHNICAL FIELD

The present invention relates to a lubricant supply device for a linear guide apparatus, and a linear guide apparatus.

BACKGROUND ART

A linear guide apparatus has hitherto been known, the configuration being such that a lubricating member disposed on a direction change path of an end cap performs lubrication by bringing rolling elements into contact with the lubricating member for smoothly rolling the rolling elements within a slider. This configuration entails referring to, e.g., Japanese Patent Application Laid-Open Publication No. 2009-63059 and Japanese Patent Application Laid-Open Publication No. 2009-68611.

DOCUMENTS OF PRIOR ARTS

Patent Documents

Patent document 1: Japanese Patent Application Laid-Open Publication No. 2009-63059
Patent document 2: Japanese Patent Application Laid-Open Publication No. 2009-68611

SUMMARY OF THE INVENTION

Problems to be Solved by the Invention

In the conventional linear guide apparatus described above, however, upon a bump of the rolling element against the lubricating member disposed on the direction change path of the end cap, it follows that the lubricating member is damaged, and fragments thereof enter between the direction change path and the rolling elements. As a result, a surface of the direction change path plastically deforms and bulges out, and, whenever rolling elements pass through the bulged portion, load is repeatedly applied to the rolling elements and the direction change path. Consequently, stress is locally generated to cause exfoliation and damage instanced by abrasive wear and other equivalent damages, resulting possibly in a failure and an operational defect of the slider.

Further, the conventional linear guide apparatus described above produces a stepped portion between the direction change path of the end cap and the lubricating member. Therefore, the rolling elements rolling along the direction change path bump against the stepped portion and, perform a so-called zigzag run while deviating from a trajectory of the rolling elements. Damages instanced by adhesion and other equivalent deteriorations are thereby caused in the rolling elements and the direction change path, resulting possibly in the failure and the operational defect of the slider.

The present invention, which was devised in view of such circumstances, aims at providing a lubricant supply device for a linear guide apparatus and a linear guide apparatus including the lubricant supply device that is capable of lubricating a slider while preventing damages to a direction change path of an end cap and to rolling elements.

Means for Solving the Problems

For solving the problems described above, the present invention provides a lubricant supply device for a linear guide apparatus, including:
an end cap disposed at an end portion of a slider in a longitudinal direction thereof, and having a direction change path for changing over a rolling direction of rolling elements within the slider; and
a container retaining lubricant and disposed adjacent to the end cap,
the end cap being formed with a through-hole extending toward the container from the direction change path,
the container being formed with an aperture communicating with the through-hole of the end cap,
the lubricant being supplied into the direction change path via the through-hole of the end cap.

The present invention further provides a linear guide apparatus including the lubricant supply device for the linear guide apparatus.

Effect of the Invention

According to the present invention, it is feasible to provide the lubricant supply device for the linear guide apparatus and the linear guide apparatus including the lubricant supply device that is capable of lubricating the slider while preventing the damage to the direction change path of the end cap and to the rolling element.

BRIEF DESCRIPTION OF THE DRAWINGS

FIGS. 12A and 12B are a rear side and a side view of the lubricant container according to the second embodiment, a dotted line in FIG. 12B depicting an internal structure of the lubricant container.

EMBODIMENTS FOR CARRYING OUT THE INVENTION (First Embodiment)

A linear guide apparatus including a lubricant supply device for the linear guide apparatus according to each of embodiments of the present invention will hereinafter be described based on the accompanying drawings. In the present specification, in a state where a guide rail of the linear guide apparatus is horizontalized, a direction intersecting the horizontal direction at a right angle is set as a widthwise direction with respect to a longitudinal direction of the guide rail, and a direction intersecting perpendicularly both of the longitudinal direction and the widthwise direction is set as a vertical direction. An up-sided surface, a low-sided surface and widthwise surfaces each extending in the longitudinal direction of the guide rail are defined as an upper surface, a lower surface and side surfaces, respectively; and end-sided surfaces in the longitudinal direction are defined as end surfaces.

Figure 1A:
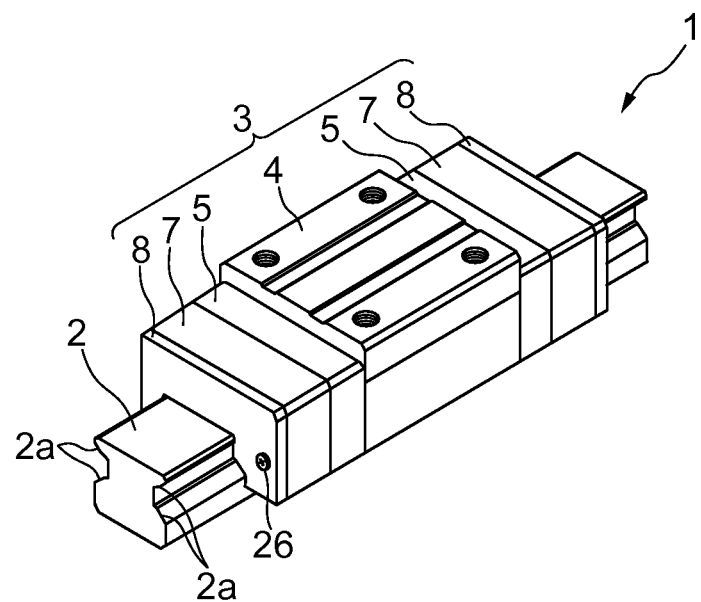
FIGS. 1A and 1B are an external view and a side view of a linear guide apparatus according to a first embodiment.
Figure 1B:
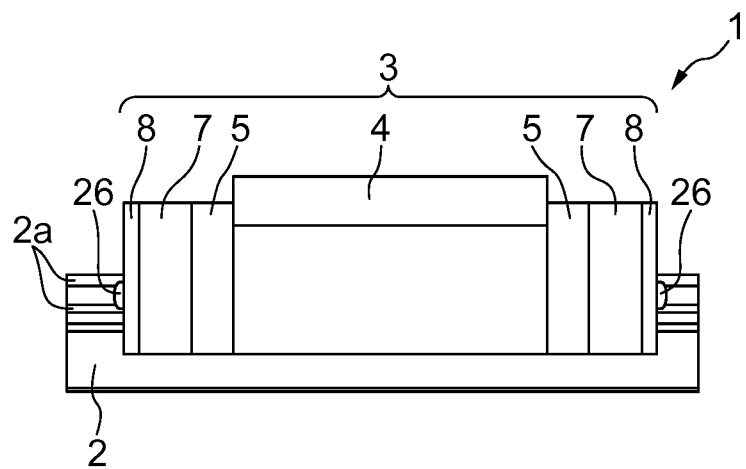

The discussion will begin with an overview of configuration of the linear guide apparatus including the lubricant supply device for the linear guide apparatus according to the first embodiment with reference to FIG. 1. A linear guide apparatus 1 according to the first embodiment illustrated in FIG. 1 is suitable for a numerical control (NC) machine tool, an NC measuring machine and other equivalent machines, the linear guide apparatus being configured to include a guide rail 2 and a slider 3 movable along the guide rail 2. The guide rail 2 is composed of a member taking substantially a square shape, and includes rolling grooves 2a formed by twos in both of side surface so as to extend in the longitudinal direction. The slider 3 is configured to include a slider body 4, and couples of end caps 5, lubricant containers 7 and side seals 8, these couples components being fitted to both of ends of the slider body 4 in the longitudinal direction, i.e., in a bilateral direction in FIG. 1B in this sequence from the slider body 4.

Figure 7A:
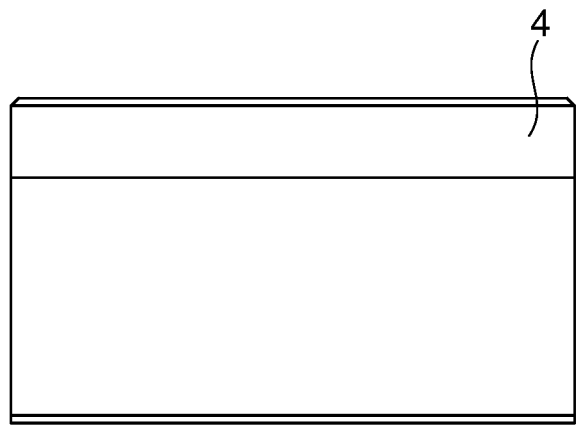
FIGS. 7A and 7B are a side view of a slider body and a view depicting an end surface of the slider body according to the first embodiment.
Figure 7B:
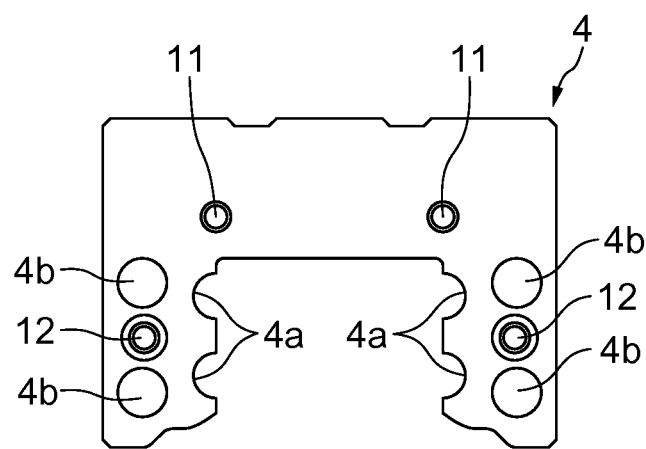

The slider body 4 is, as depicted in FIG. 1A and 7, composed of a metallic member extending in the longitudinal direction of the guide rail 2 and taking substantially a U-shape in section, the slider body 4 being fitted to the guide rail 2 so as to slidably bridge over the guide rail 2 (so as to slidably stride over the guide rail 2). As illustrated in FIG. 7B, rolling grooves 4a extending in the longitudinal direction are provided by twos in a face-to-face relation with the rolling grooves 2a of the guide rail 2, these rolling grooves 4a being formed in portions, opposite to both of the side surfaces of the guide rail 2, of the slider body 4, i.e., in both of inside surface of leg portions of the slider body 4. Rolling paths for unillustrated rolling elements are configured by the rolling grooves 4a of the slider body 4 and the rolling grooves 2a of the guide rail 2. Note that a plurality of balls serving as the rolling elements is loaded into the rolling paths. As depicted in FIG. 7B, return paths 4b each taking a circular shape in section are formed by twos in the leg portions on both sides of the slider body 4 so as to penetrate in the longitudinal direction of the slider body 4, i.e., in the perpendicular direction as viewed on the sheet surface in FIG. 7B. Screw holes 11, 12 are formed by twos in both of the end surfaces of the slider body 4.

Figure 2A:
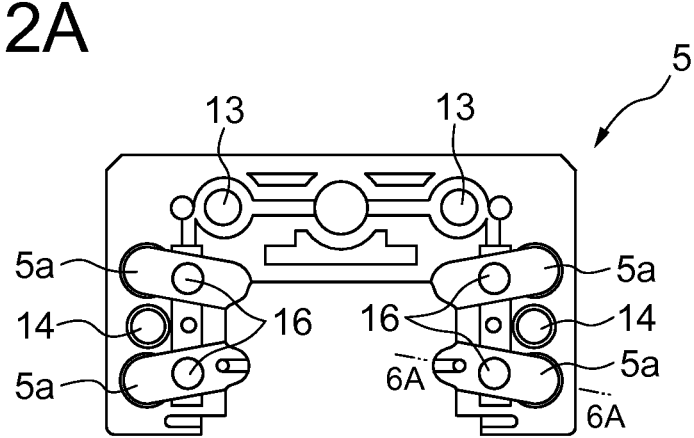
FIGS. 2A and 2B are a front view and a rear view of an end cap according to the first embodiment.
Figure 2B:
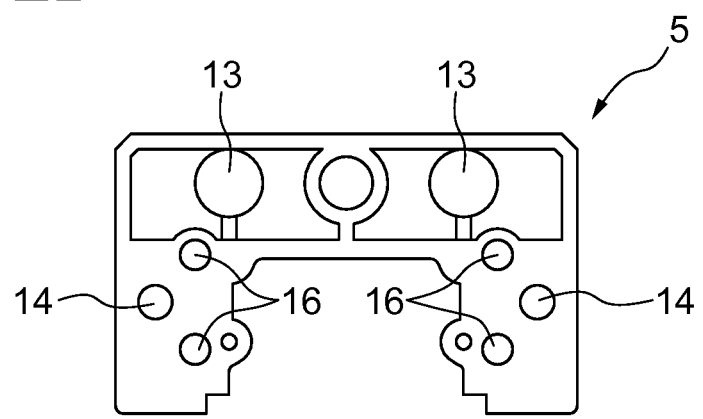
Figure 6A:
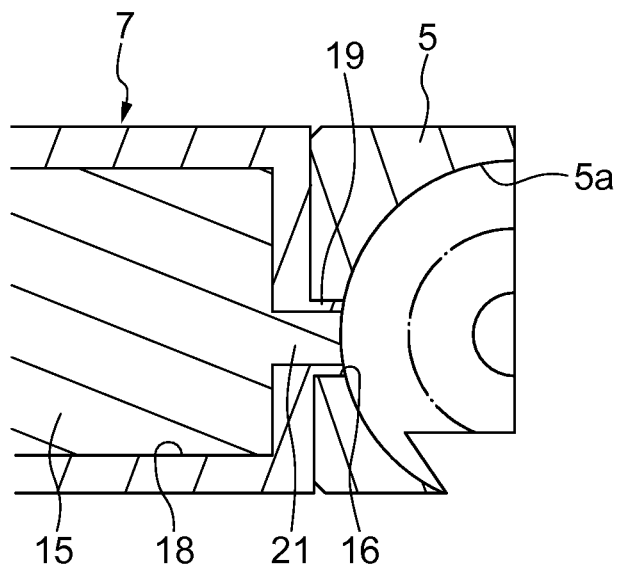
FIGS. 6A and 6B are a sectional view taken along the line 6A-6A of FIG. 2A and a partially enlarged view of FIG. 6A, illustrating how the lubricant container is attached to the end cap according to the first embodiment.

The end cap 5 is a resinous member and takes substantially the U-shape as depicted in FIG. 2. As illustrated in FIG. 2A, direction change paths 5a each taking a circular shape in section are formed by twos in leg portions on both sides of a front surface of the end cap 5, i.e., the surface directed to the slider body 4. The direction change path 5a serves to communicate the rolling path and the return path 4b with each other, and takes a semicircular shape as depicted in FIG. 6A. The end cap 5 includes circular through-holes 13, 14 formed in positions opposite to the screw holes 11, 12 of the slider body 4. Note that the end cap 5 may be formed from a metal without being limited to the resin.

Figure 8:
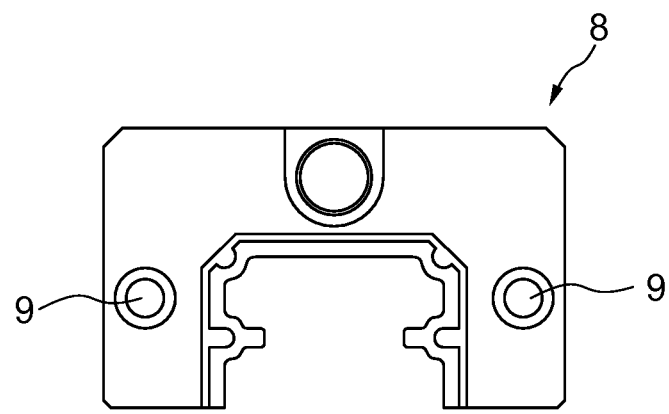
FIG. 8 is a view illustrating a side seal according to the first embodiment.

With the configuration described above, the plurality of rolling elements rolls within the rolling paths, and the slider 3 is thereby enabled to perform a linear motion along on the guide rail 2. Note that the plurality of rolling elements can circulate along the rolling path, the direction change paths 5a and the return path 4b. The side seal 8 is, as depicted in FIG. 8, a resinous or rubber plate member taking substantially the U-shape in section so as to fit to both of the side surfaces and the upper surface of the guide rail 2 so as to bridge over the guide rail 2 (so as to slidably stride over the guide rail 2). The side seal 8 taking such a shape enables, upon causing the slider 3 to perform the linear motion on the guide rail 2, elimination of foreign matters instanced by dusts, motes, contaminants and other equivalent matters, which are adhered onto both of the side surfaces and the upper surface of the guide rail 2. Note that the side seal 8 includes circular through-holes 9 formed in positions having the face-to-face relation with the screw holes 12 of the slider body 4.

Described next is a most characteristic configuration of the lubricant supply device of the linear guide apparatus according to the first embodiment. The lubricant supply device for the linear guide apparatus 1 according to the first embodiment supplies the lubricant into the slider 3, and is configured to include the end caps 5, the lubricant containers 7 and lubricating members 15 that will be described later on. The direction change path 5a of the end cap 5 is formed with the circular through-hole 16 extending in the longitudinal direction of the slider 3, i.e., the bilateral direction in FIG. 6A. This configuration entails referring to FIG. 2A as well.

Figure 3A:
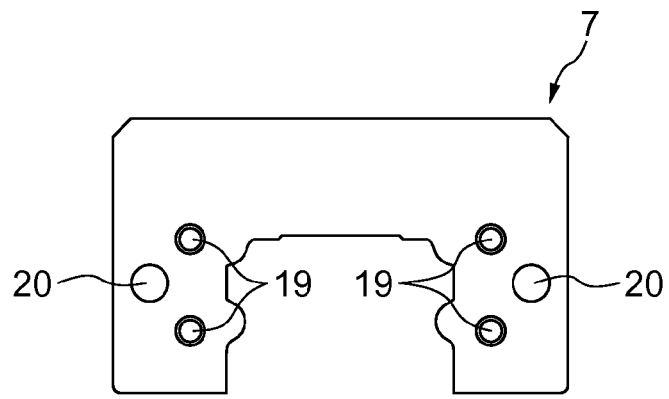
FIGS. 3A, 3B and 3C are a front view, a side view and a rear view of a lubricant container according to the first embodiment.
Figure 3B:
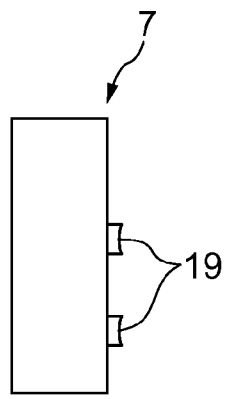
Figure 3C:
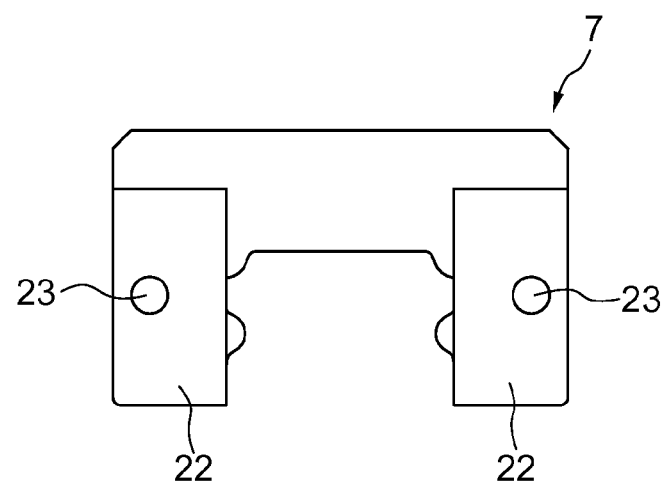
Figure 4A:
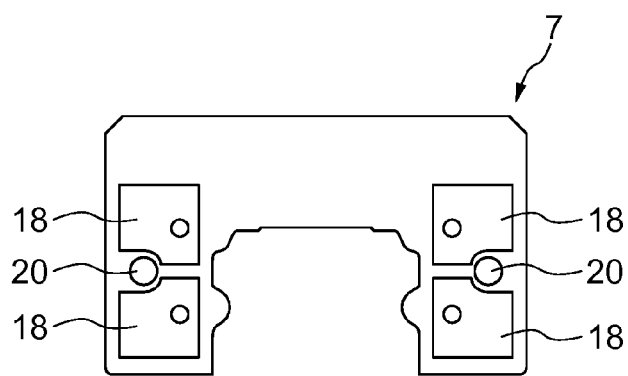
FIGS. 4A and 4B are a rear view and a side view of the lubricant container according to the first embodiment, a dotted line representing an internal structure of the lubricant container in FIG. 4B.
Figure 4B:
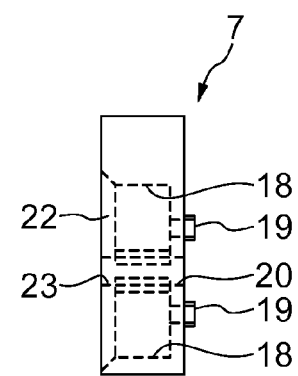
Figure 5A:
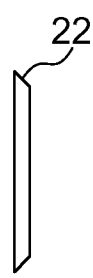
FIGS. 5A, 5B, 5C and 5D are a side view and a front view of one cover of the lubricant container, and a side view and a front view of another cover thereof according to the first embodiment.
Figure 5B:
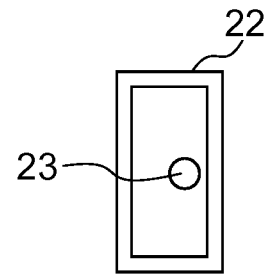
Figure 5C:
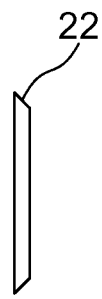
Figure 5D:
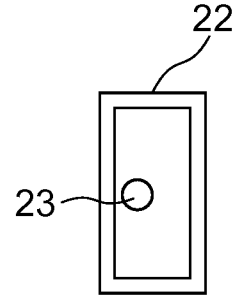

The lubricant container 7 serves to retain the lubricating member 15 and is a thick resinous plate member having substantially the same external shape as the external shape of the end cap 5, i.e., substantially the U-shape in section as illustrated in FIG. 3. Recessed portions 18 each producing an air space taking substantially a cubic shape are, as depicted in FIG. 4A, provided respectively in positions, which face the four through-holes 16 of the end caps 5, of rear surfaces of the lubricant containers 7, i.e., the outside surfaces of the slider 3 in the longitudinal direction. As illustrated in FIG. 3A, cylindrical portions 19 are integrally formed in positions of the front surfaces of the lubricant containers 7, these positions facing the four through-holes 16 of the end cap 5 as well as facing the four recessed portions 18. Each cylindrical portion 19 takes a circularly cylindrical shape suited to fitting into the through-hole 16 of the direction change path 5a of the end cap 5, the cylindrical shape extending, as illustrated in FIG. 6A, inwardly in the longitudinal direction of the slider 3, i.e., in the right direction in FIG. 6A. A hollowed portion defined as a circular aperture within the cylindrical portion 19 penetrates a bottom surface of the opposite recessed portion 18. Note that the lubricant container 7 includes circular through-holes 20 respectively formed in positions having the face-to-face relation with the two screw holes 12 of the slider body 4.

Each recessed portion 18 of the lubricant container 7 retains, as illustrated in FIG. 6A, the lubricating member 15 composed of a porous molding impregnated with the lubricant. The lubricating member 15 takes substantially a cubic shape fitted into the recessed portion 18, and is integrally formed with a cylindrical protruded portion 21 fitted into the circular aperture of the cylindrical portion 19. In other words, the air space defined by the recessed portion 18 and the cylindrical portion 19 of the lubricant container 7 is filled with the lubricating member 15 without any gap. The recessed portion 18 retaining the lubricating member 15 is, as depicted in FIG. 3C, hermetically sealed by its being attached with a cover 22 from the rear surface side of the lubricant container 7. The cover 22 is, as illustrated in FIG. 5, composed of the plate member made from the same resin as the lubricant container 7, and takes a rectangular shape for hermetically sealing the two recessed portions 18 of the lubricant container 7 at one time. Note that the cover 22 is formed with a circular through-hole 23 in a position opposite to the through-hole 20 of the lubricant container 7.

Figure 6B:
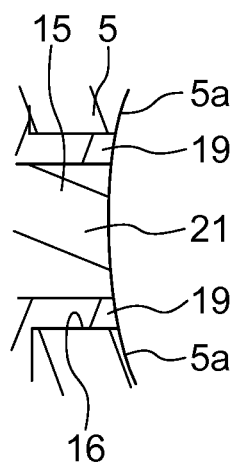

With the configuration described above, as illustrated in FIG. 6A, when attaching the lubricant container 7 retaining the lubricating member 15 to the end cap 5, the cylindrical portion 19 of the lubricant container 7 can be fitted into the through-hole 16 of the direction change path 5a of the end cap 5. The cylindrical portion 19 of the lubricant container 7 and the protruded portion 21 of the lubricating member 15 can be exposed into the direction change path 5a. Herein, in the longitudinal direction of the slider body 4, i.e., in the bilateral direction in FIG. 6, a length of the cylindrical portion 19 of the lubricant container 7 and a length of the projection 21 serving as the protruded portion 21 of the lubricating member 15, are designed not to produce a stepped portion among the cylindrical portion 19, the protruded portion 21 and the rolling groove. A front end surface of the cylindrical portion 19 of the lubricant container 7 and a front end surface of the protruded portion 21 of the lubricating member 15 are, as depicted in FIG. 6B, each worked in a curved surface shape matching with the rolling groove 2a of the direction change path 5a of the end cap 5.

Procedures of how the slider 3 according to the first embodiment is assembled will be described with reference to FIG. 9. Note that the lubricant container 7 is hermetically sealed beforehand by inserting the lubricating member 15 into each recessed portion 18 and attaching the cover 22 from the rear surface side.

Figure 9A:
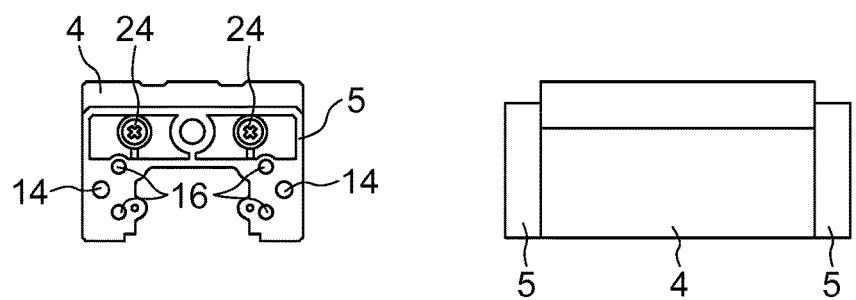
FIGS. 9A-9C are views illustrating how the slider according to the first embodiment is assembled, and depicting an end surface and a side surface of the slider.

Procedure 1: The end caps 5 are, as illustrated in FIG. 9A, disposed at both of end portions of the slider body 4 in the longitudinal direction, with the surfaces formed with the direction change paths 5a, i.e., the front faces being directed toward the slider body 4. Screws 24 are fixed into screw holes 11 of the slider body 4 through the through-holes 13 of the end caps 5. The through-holes 13 and the screw holes 11 are unillustrated in FIG. 9. With this procedure 1, the attachment of the end caps 5 to the slider body 4 is attained.

Figure 9B:
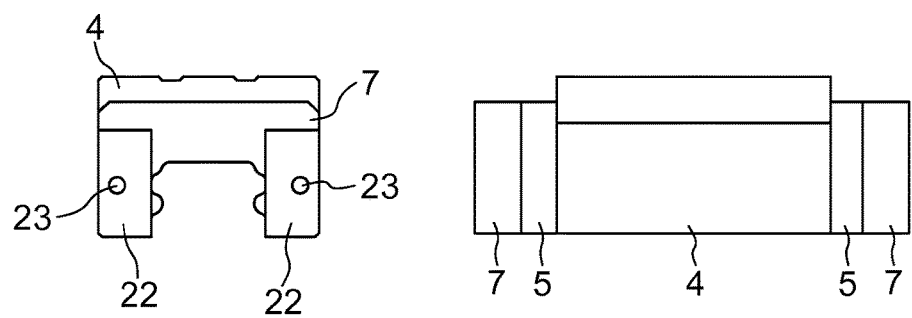

Procedure 2: As depicted in FIG. 9B, on each end cap 5 the lubricant container 7 is attached from the outside of the slider body 4 in the longitudinal direction, with the surface formed with the cylindrical portions 19, i.e., the front face being directed toward the end cap 5. The cylindrical portions 19 are unillustrated in FIG. 9. At this time, the cylindrical portions 19 of the lubricant container 7 are inserted respectively into the through-holes 16 of the end cap 5. Positioning of the lubricant container 7 with respect to the end cap 5 is thereby attained.

Figure 9C:
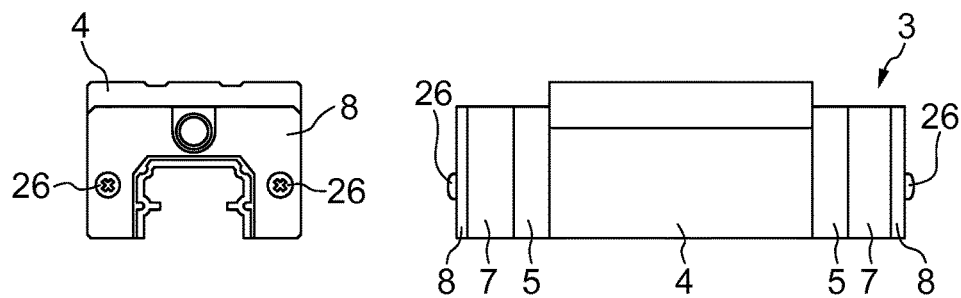

Procedure 3: As depicted in FIG. 9C, on each lubricant container 7 the side seal 8 is disposed from the outside of the slider body 4 in the longitudinal direction. Screws 26 are fixed into the screw holes 12 of the slider body 4 via the through-holes 9 of the side seal 8, the through-holes 23 of the cover 22 for the lubricant container 7, the through-holes 20 of the lubricant container 7, and through-holes 14 of the end cap 5 in this sequence. The through-holes 9, 20 and the screw holes 12 are unillustrated in FIG. 7. The attachment of the lubricant containers 7 and the side seals 8 to the slider body 4 is thereby attained.

The slider 3 can be easily assembled through the assembly procedures described above. Especially in the procedure 2, the cylindrical portions 19 of the lubricant container 7 are inserted respectively into the four through-holes 16 of the end cap 5 in the manner described above, whereby the lubricant container 7 can be positioned with respect to the end cap 5. Hence, in the procedure 3, the lubricant container 7 can be easily fixed together with the side seal 8 to the slider body 4 by use of the common screws 26. The configuration being such that the lubricating members 15 are held respectively in the four recessed portions 18 of the lubricant container 7 as described above, the four lubricating members 15 can be treated at one time by the lubricant container 7. This configuration therefore facilitates the assembly of the slider 3 and also maintenance of the slider 3. The lubricating members 15 can be individually treated, and hence the slider 3 can be uniformly lubricated throughout.

In the slider body 4 being assembled based on the assembly procedures described above, the front end of the cylindrical portion 19 of the lubricant container 7 and the front end of the protruded portion 21 of the lubricating member 15 are exposed from the through-hole 16 into the direction change path 5a of the end cap 5, and form a curved surface along the rolling groove of the direction change path 5a within the through-hole 16. More specifically, the front end surface of the cylindrical portion 19 of the lubricant container 7 and the front end surface of the protruded portion 21 of the lubricating member 15 configure the single curved surface together with the rolling groove of the direction change path 5a. This configuration enables, when causing the slider 3 to perform the linear motion on the guide rail 2, the lubrication into the slider 3 by applying the lubricant over the front end surface of the protruded portion 21 of the lubricating member 15 upon a contact between the rolling elements rolling along the direction change path 5a and the front end surface of the protruded portion 21.

As described above, the front end of the cylindrical portion 19 of the lubricant container 7 and the front end of the protruded portion 21 of the lubricating member 15 form the curved surface along the rolling groove of the direction change path 5a, thereby enabling the rolling elements to smoothly roll within the direction change path 5a. It does not therefore happen that the rolling elements bump against the lubricating member 15, and fragments of the broken lubricating member 15 enter as foreign matters between the direction change path 5a and the rolling elements as seen in the prior arts. A possibility does not arise of causing a zigzag run of the rolling element upon a bump against a stepped portion produced between the direction change path 5a and the lubricating member 15 as seen in the prior arts. It is therefore feasible to prevent the rolling elements and the direction change path 5a from being damaged, also prevent a failure and an operational defect of the slider 3.

(Second Embodiment)

Figure 10A:
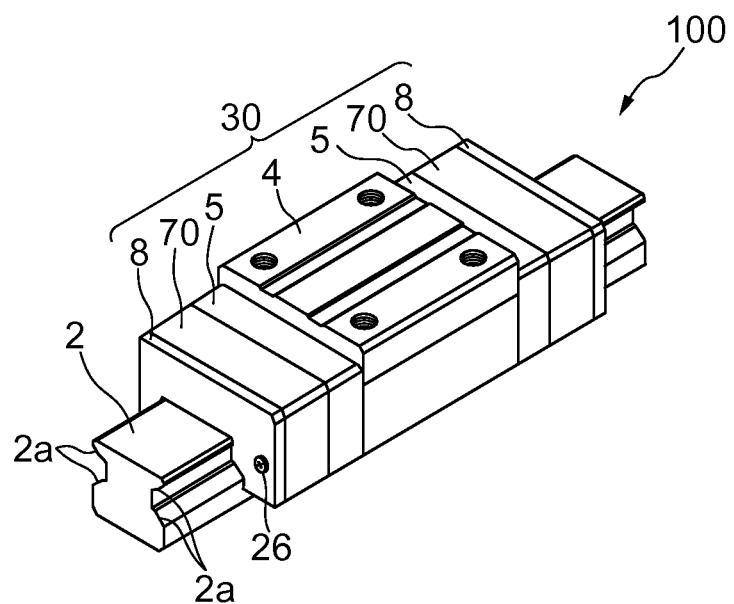
FIGS. 10A and 10B are an external view and a side view of a linear guide apparatus according to a second embodiment.
Figure 10B:
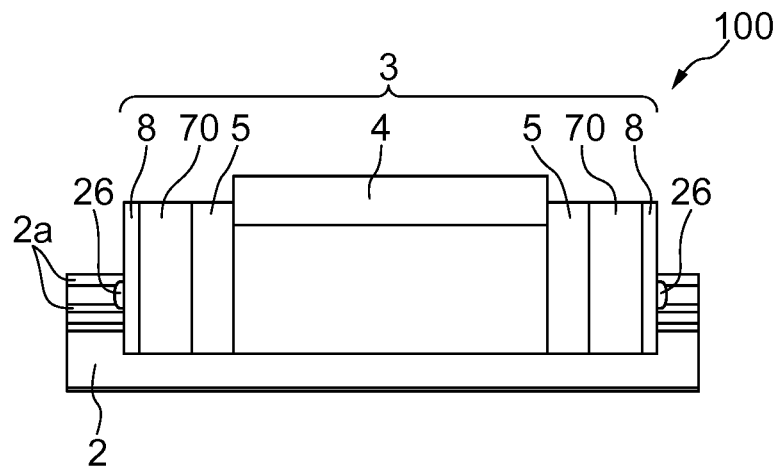

A detailed discussion will focus on different components, from those of the first embodiment, of a linear guide apparatus 100 including a lubricant supply device for the linear guide apparatus according to a second embodiment illustrated in FIG. 10, while omitting the repetitive explanations of the same components marked with the same numerals and symbols as those of the first embodiment. The lubricant supply device for the linear guide apparatus according to the second embodiment is configured to include the end caps 5, lubricant containers 70 and lubricating members 150.

Figure 11A:
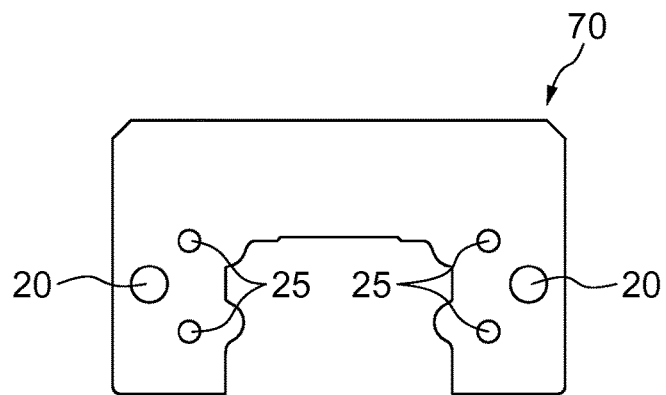
FIGS. 11A, 11B and 11C are a front view, a side view and a rear view of the lubricant container according to the second embodiment.
Figure 11B:
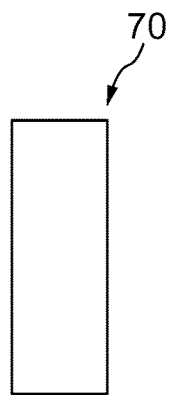
Figure 11C:
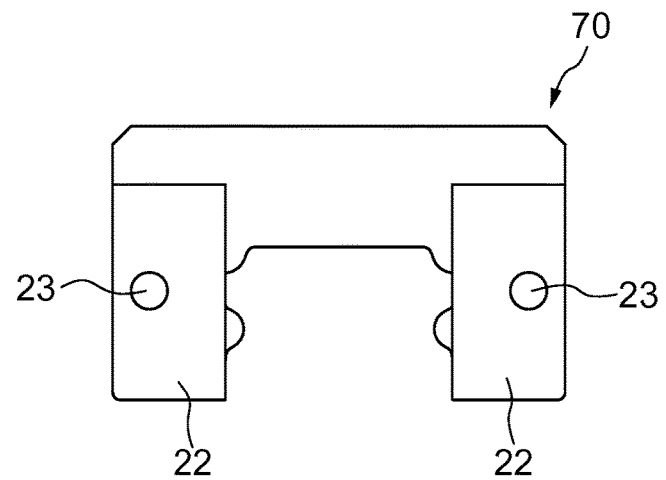
Figure 13A:
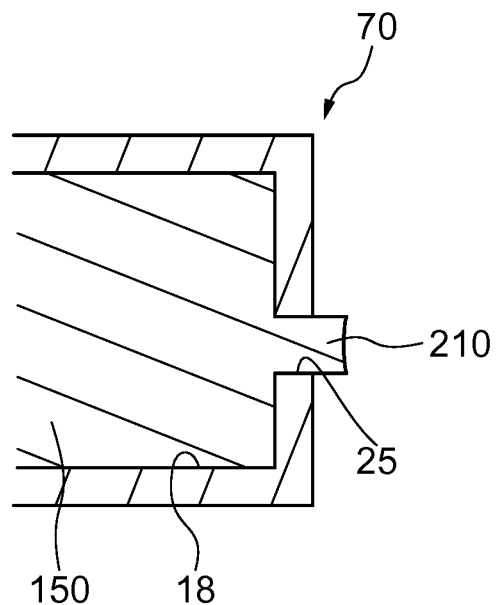
FIGS. 13A and 13B are a view illustrating a lubricating member retained in the lubricant container according to the second embodiment, and a sectional view, corresponding to FIG. 6A in the first embodiment, depicting how the lubricant container is attached to the end cap.
Figure 13B:
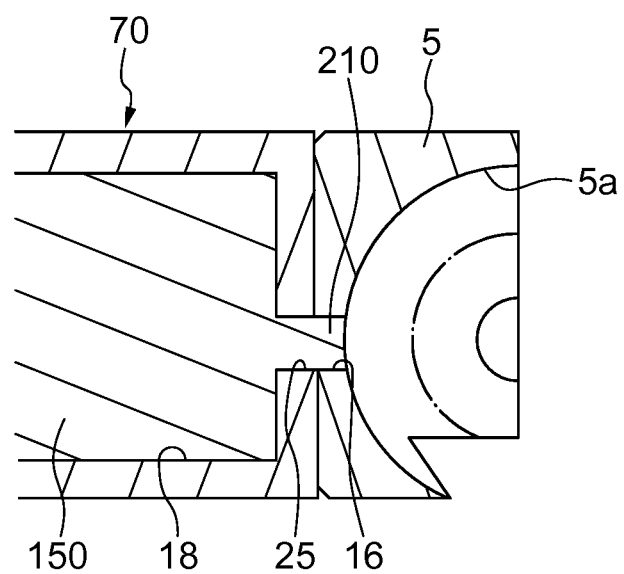

As illustrated in FIGS. 11A and 12A, each of the lubricant containers 70 according to the second embodiment includes, in place of the cylindrical portions 19 of the lubricant containers 7 in the first embodiment, circular apertures 25 each having the same diameter as the diameter of the through-hole 16, the apertures 25 being formed in positions in the face-to-face relation with the four recessed portions 18 and with the four through-holes 16 of the end cap 5. As depicted in FIG. 13A, the lubricating member 150 retained in the recessed portion 18 of the lubricant container 70 takes substantially the cubic shape suited to fitting in the recessed portion 18, and is integrally formed with a protruded portion 210 extending inward in the longitudinal direction of a slider 30, i.e., in the right direction in FIG. 13A, and protruding outwardly from the circular aperture 25 of the lubricant container 70. The protruded portion 210 takes, as illustrated in FIG. 13B, a circular column shape suited to fitting in the circular aperture 25 of the lubricant container 70 and in the through-hole 16 of the end cap 5.

The configuration described above enables, as depicted in FIG. 13B, the protruded portion 210 of the lubricating member 150 to be fitted in the through-hole 16 of the direction change path 5a of the end cap 5. The protruded portion 210 of the lubricating member 150 can be exposed into the direction change path 5a. Herein, in the longitudinal direction of the slider body 4, i.e., in the bilateral direction in FIG. 13B, a length of the protruded portion 210 of the lubricating member 150 is designed not to produce a stepped portion among the protruded portion 210 and the rolling groove of the direction change path 5a of the end cap 5. A front end surface of the protruded portion 210 of the lubricating member 150 is, as depicted in FIG. 13B, worked in a curved surface shape matching with the rolling groove of the direction change path 5a of the end cap 5.

Figure 14A:
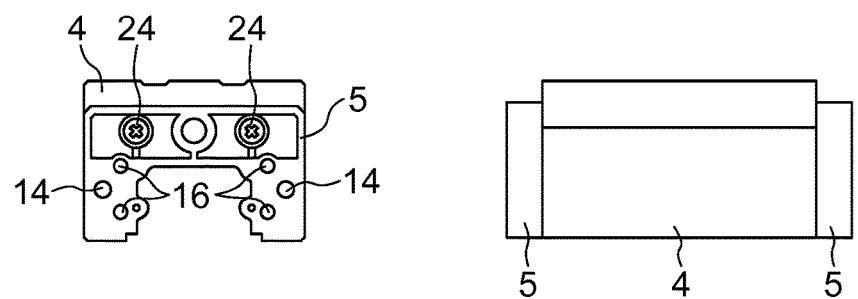
FIGS. 14A-14C are views illustrating how the slider according to the second embodiment is assembled, and depicting end surfaces and side surfaces of the slider.

Procedures of how the slider 30 according to the second embodiment is assembled will be described with reference to FIG. 14. Note that the lubricant container 70 is hermetically sealed beforehand by inserting the lubricating member 150 into each recessed portion 18 and attaching the cover 22 from the rear surface side.

Figure 14B:
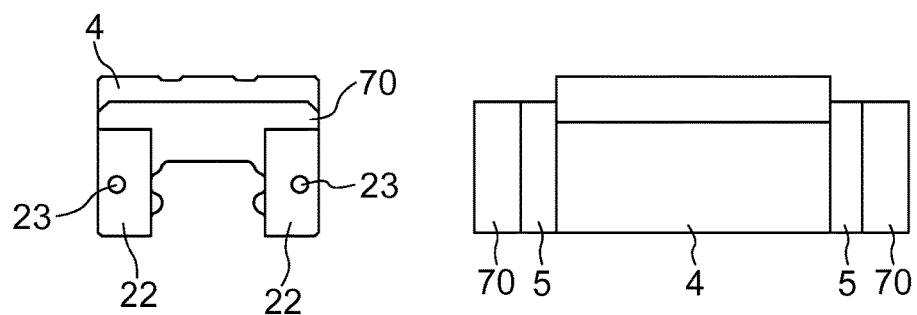
Figure 14C:
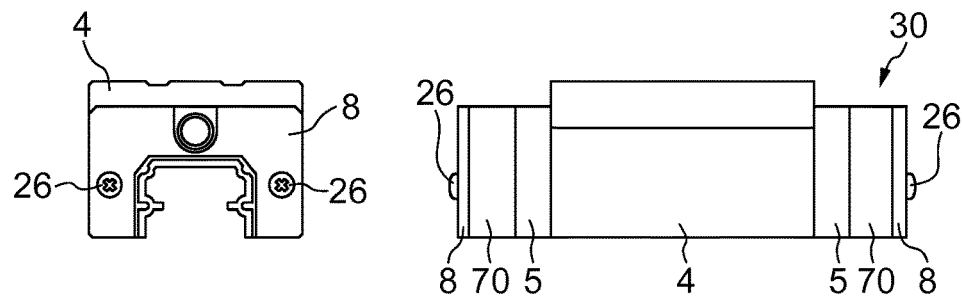

Procedure 1: The same as the procedure 1 of the assembly procedures of the slider 3 according to the first embodiment. The procedure 1 entails referring to FIG. 14A Procedure 2: As illustrated in FIG. 14B, the lubricant container 70 is attached to each end cap 5 from outwardly of the slider body 4 in the longitudinal direction, with the surface formed with the circular aperture 25, i.e., the front face being directed toward the end cap 5. The circular aperture 25 is unillustrated in FIG. 12. Hereat, the protruded portion 210 of the lubricating member 150 is inserted into each through-hole 16 of the end cap 5. The positioning of the lubricant container 70 with respect to the end cap 5 is thereby attained.

Procedure 3: The same as the procedure 3 of the assembly procedures of the slider 3 according to the first embodiment. The procedure 3 entails referring to FIG. 14C.

The slider 30 can be easily assembled through the assembly procedures described above. Especially in the procedure 2, the protruded portions 210 of the lubricating members 150 are inserted into the four through-holes 16 of the end caps 5, whereby the lubricant containers 70 can be positioned with respect to the end caps 5. Therefore, the same effects as those in the first embodiment can be exhibited.

In the slider 30 assembled based on the assembly procedures, the front end of the protruded portion 210 of the lubricating member 150 is, as depicted in FIG. 13B, exposed from within the through-hole 16 into the direction change path 5a of the end cap 5, and a curved surface is formed along the rolling groove of the direction change path 5a within the through-hole 16. More specifically, the front end surface of the protruded portion 210 of the lubricating member 150 configures a single curved surface together with the rolling groove of the direction change path 5a. With this configuration, the same effects as those in the first embodiment can be exhibited.

In particular, the lubricant container 70 according to the second embodiment does not include the cylindrical portion 19 of the lubricant container 7 according to the first embodiment, and hence there is no possibility of causing a slight backlash between the front end of the cylindrical portion 19 and the direction change path 5a due to working accuracy of the cylindrical portion 19. The rolling elements are thereby enabled to smoothly roll within the direction change path 5a. It is therefore feasible to effectively prevent the rolling elements and the direction change path 5a from being damaged, and also effectively prevent the failure and the operational defect of the slider 3.

In the respective embodiments, the through-hole 16 of the direction change path 5a of the end cap 5 takes the circular shape, as the shapes corresponding to this circular shape, the cylindrical portion 19 of the lubricant container 7 takes the circularly cylindrical shape, and the protruded portion 21 of the lubricating member 15 takes the circular column shape in the first embodiment. In the second embodiment, the lubricant container 70 is provided with the circular apertures 25, and the protruded portion 210 of the lubricating member 150 takes the circular column shape. Without being limited to these shapes, however, the through-hole 16 of the direction change path 5a takes, e.g., a rectangular shape, and the respective portions of the lubricant containers 7, 70 and the lubricating members 15, 150 may also be configured corresponding to this rectangular shape.

In each of the respective embodiments, the lubricant containers 7, 70 is provided with the four lubricating members 15, 150 corresponding to the four through-holes 16 of the direction change paths 5a of the end cap 5. Without being limited to this configuration, however, two lubricating members each provided with two protruded portions 21, 210 are prepared, and the lubricant container may be configured to be provided with two recessed portions for retaining these two lubricating members. Note that both of the lubricant container 7, 70 and the covers 22 are composed of resins but maybe composed of metals without being limited to the resins.

The configuration in each of the embodiments is that the lubricating member 15, 150 composed of the porous molding impregnated with the lubricant is retained in each of the recessed portions 18 of the lubricant container 7, 70. Without being limited to this configuration, however, another available configuration is that each recessed portions 18 of the lubricant containers 7, 70 retains the lubricant itself instanced by grease, lubricating oil and other equivalent lubricating agent. Concretely, the first embodiment may adopt a configuration that the lubricant fills an air space defined by the recessed portion 18 of the lubricant container 7 and by the cylindrical portion 19. Further, the second embodiment may adopt a configuration that the lubricant fills an air space defined by the recessed portion 18 of the lubricant container 70, the circular aperture 25 and the through-hole 16 of the direction change path 5*a* of the end cap 5.

In the respective embodiments, it is preferable to use synthetic resins having high chemical resistance, instanced concretely by polyethlene (PE), polypropylene (PP), polyamide (PA) and polyacetal (POM) as materials of the lubricant containers 7, 70. Note that a material of the end cap 5 involves preferably using POM having elasticity to facilitate the fitting to the slider body 4. Therefore, a material of the lubricant container 7, 70 involves preferably using POM in particular to facilitate the fitting to the end cap 5 and to enable absorption of minute vibrations intermittently generated when the slider 3, 30 passes through a joint between the guide rail 2 and the guide rail 2.

In the respective embodiments, a material of the lubricating member 15, 150 involves preferably using a high polymer material particularly like polyolefin instanced by polypropylene, polyethylene and other equivalent materials. A specific gravity of polyolefin is equal to or smaller than "1". Accordingly, the lubricating member 15, 150 is composed of polyolefin, load applied to the lubricant container 7, 70 from the lubricating member 15, 150 is thereby reduced, and hence polyolefin is a material effective in the lubricant container 7, 70. Further, polyolefin has a high insulating property. Accordingly, static electricity is produced by frictions between the direction change path 5*a* of the end cap 5 and the rolling elements when the slider 3, 30 runs on the guide rail 2, in which case also the insulation can be attained by lubricating member 15, 150 composed of polyolefin. It is therefore possible to prevent the lubricant container 7, 70 from being damaged by the static electricity.

In the first embodiment, as illustrated in FIG. 6B, the cylindrical portion 19 of the lubricant container 7 exposed to the direction change path 5*a* of the end cap 5 and the protruded portion 21 of the lubricating member 15, are flush with the rolling groove of the direction change path 5*a*. Consequently, it does not happen that the protruded portion 21 of the lubricating member 15 is damaged upon the bump against the rolling elements. As described above, POM has the elasticity, and hence, when the lubricating member 15 is composed of POM, such an effect is exhibited at the maximum, whereby the lubricating member 15 can be well protected. Note that the same is applied to the protruded portion 210 of the lubricating member 150 in the second embodiment described above. In the case of the configuration that the cylindrical portion 19 of the lubricant container 7 is, as illustrated in FIG. 6B, fitted to the protruded portion 21 of the lubricating member 15, it is preferable that the fitting of protruded portion 21 to the cylindrical portion 19 is facilitated by using PE as a soft material of the lubricating member 15. Incidentally, it is more preferable that PE is compounded with PP to provide rigidity to PE.

Other materials of the lubricating member 15, 150 may involve using animal hairs instanced by sheep wools and other equivalent hairs, aramid, glass, cellulose, nylon, polyester, polyether, polyolefin, viscose, and so on. Note that the lubricating member 15, 150 can be used by being felted.

The lubricant supply devices for the linear guide apparatus are provided at both of the end portions of the slider body 4, and, however, it is also an available configuration to provide the lubricant supply device for the linear guide apparatus at only one end portion of the slider body 4. The respective embodiments have exemplified the linear guide apparatuses 1, 100 including the balls as the rolling elements, and, however, a linear guide apparatus can be configured to include rollers as the rolling elements without being limited to the configuration described above.

What is claimed is:

1. A lubricant supply device for a linear guide apparatus, comprising:
   an end cap disposed at an end portion of a slider in a longitudinal direction, and having a direction change path for changing over a rolling direction of rolling elements within the slider; and
   a container retaining lubricant and disposed adjacent to the end cap,
   the end cap being formed with a through-hole extending toward the container from the direction change path,
   the container being formed with an aperture communicating with the through-hole of the end cap,
   the lubricant being supplied into the direction change path via the through-hole of the end cap,
   wherein the container retains a lubricating member having a protruded portion composed of porous molding impregnated with the lubricant,
   the protruded portion of the lubricating member protrudes from the aperture of the container, is inserted into the through-hole of the end cap and is exposed into the direction change path, and
   a front end of the protruded portion of the lubricating member forms a curved surface along a rolling groove of the direction change path.

2. The lubricant supply device for the linear guide apparatus according to claim 1, wherein the container includes a cylindrical portion positioned at the aperture,
   the protruded portion of the lubricating member protrudes from the aperture and is fitted in a hollowed portion within the cylindrical portion,
   the cylindrical portion is fitted in the through-hole of the end cap, and the protruded portion of the lubricating member and the cylindrical portion of the container are exposed into the direction change path of the end cap, and
   the front end of the protruded portion of the lubricating member and a front end of the cylindrical portion of the container form curved surfaces along the rolling groove of the direction change path of the end cap.

3. The lubricant supply device for the linear guide apparatus according to claim 1, wherein the protruded portion of the lubricating member, which protrudes from the aperture of the container, is fitted in the through-hole of the end cap.

4. The lubricant supply device for the linear guide apparatus according to claim 1, wherein the container has a recessed portion to retain the lubricant, and a cover to cover the recessed portion, and
   the aperture is formed in a bottom surface of the recessed portion.

5. The lubricant supply device for the linear guide apparatus according to claim 4, wherein the end cap has a plurality of direction change paths,
   the end cap has a respective through-hole extending toward the container from each direction change path, the container includes recessed portions corresponding to the through-holes of the end cap, each recessed portion retains a respective lubricating member to supply lubricant to one of the direction change paths via the corresponding through-hole, and each lubricating member has a respective protruded portion with a front end forming a curved surface along a rolling groove of the corresponding direction change path.

6. A linear guide apparatus including the lubricant supply device for the linear guide apparatus according to claim 1.

7. The linear guide apparatus according to claim 6, wherein the slider has a side seal disposed adjacent to the container, the side seal, the container and the end cap are respectively formed with through-holes in a face-to-face relation with a screw hole formed in an end portion of a slider body in a longitudinal direction thereof, and a screw is fitted in the screw hole of the slider body via the through-holes of the side seal, the container and the end cap in this sequence.

* * * * *